2 Sheets—Sheet 1.

E. BOURNE.

Method of Securing Fish-Plates to Railway-Rails.

No. 8,762. Reissued June 17, 1879.

WITNESSES
Harvey L. Page
W. E. Chaffee

Edward Bourne
INVENTOR
by Chas. L. Page
his ATTORNEY

2 Sheets—Sheet 2

E. BOURNE.

Method of Securing Fish-Plates to Railway-Rails.

No. 8,762. Reissued June 17, 1879.

WITNESSES

C. H. Myers

Otis R. Omohundro

Edward Bourne

INVENTOR by Chas. G. Page

ATTORNEY

UNITED STATES PATENT OFFICE.

EDWARD BOURNE, OF PITTSBURG, PENNSYLVANIA.

IMPROVEMENT IN METHODS OF SECURING FISH-PLATES TO RAILWAY-RAILS.

Specification forming part of Letters Patent No. 204,476, dated June 4, 1878; Reissue No. 8,762, dated June 17, 1879; application filed December 30, 1878.

*To all whom it may concern:*

Be it known that I, EDWARD BOURNE, of Pittsburg, in the county of Allegheny, State of Pennsylvania, have invented a certain new and useful Improvement in Securing Splice-Bars to Rails of Railways by means of Tubular Rivets; and I do hereby declare that the following is a full and exact description thereof, reference being had to the accompanying drawings, and to the letters of reference marked thereon.

Heretofore all tubular rivets used in uniting material objects have for that purpose their ends spread or flared out, so as to form thereon a sort of hollow conical head, similar to the ordinary eyelet. Where a mere union of parts is wanted, the flaring tubular rivet will answer that end; but when once placed, the difficulty of withdrawal makes it for some purposes very objectionable.

Now, my invention consists in securing the splice-plates to rails of railways in the formation of fish-joints by upsetting the ends of the tubular rivets employed, and thereby forming heads thereon, in contradistinction to the spreading out process.

To enable others skilled in the art to use my invention, I will proceed to describe the same.

Figure 1:
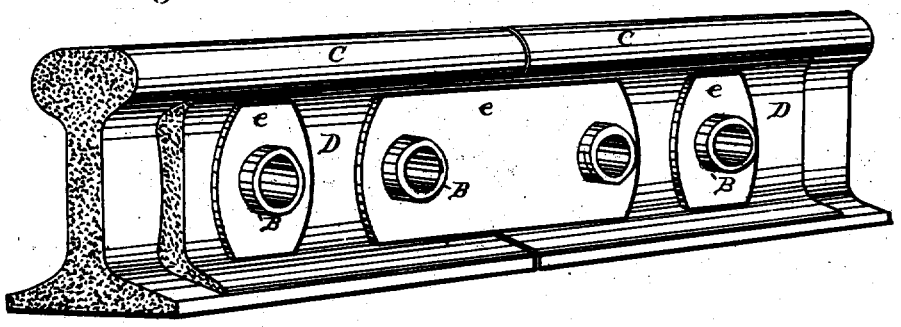
Figure 2:
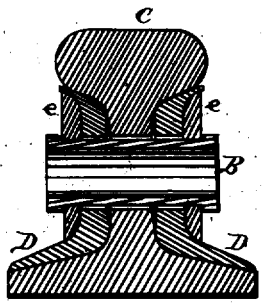

In the accompanying drawings, which form part of my specification, Figure 1 is a perspective view of two railway-rails joined together by means of fish-bars and my improved tubular rivet. Fig. 2 is a transverse vertical section of one of said rails with the splice-plate, washers, and tubular rivets.

The rails C, splice-plates D, and washers *e* may be of such form as are most generally used. To unite these splice-plates firmly to the rails, I make use of a tubular rivet, B, instead of the ordinary screw-bolt and nut. These rivets are to be of such length that their ends will project about half an inch when placed in the holes through the splice-plates, rails, and washers, and thick enough to withstand successfully the upsetting process. As soon as the rivet is placed in position, so much of its ends as project beyond and outside of the splice-plates are, by means of suitable machinery, formed into a square shoulder next to and against the splice-plate D or washer *e*, as the case may be, without enlarging the diameter of the interior of the tubular rivets.

In case it should become necessary to remove the rivet any suitable machinery for that purpose can be used.

Figure 3:
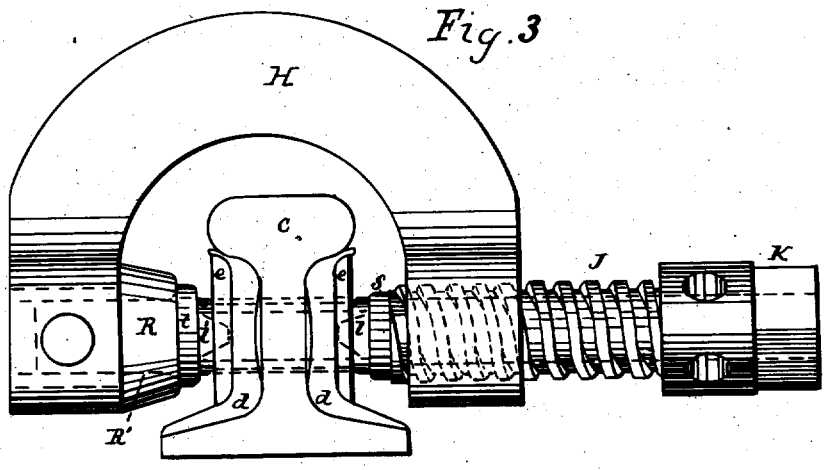
Figure 4:
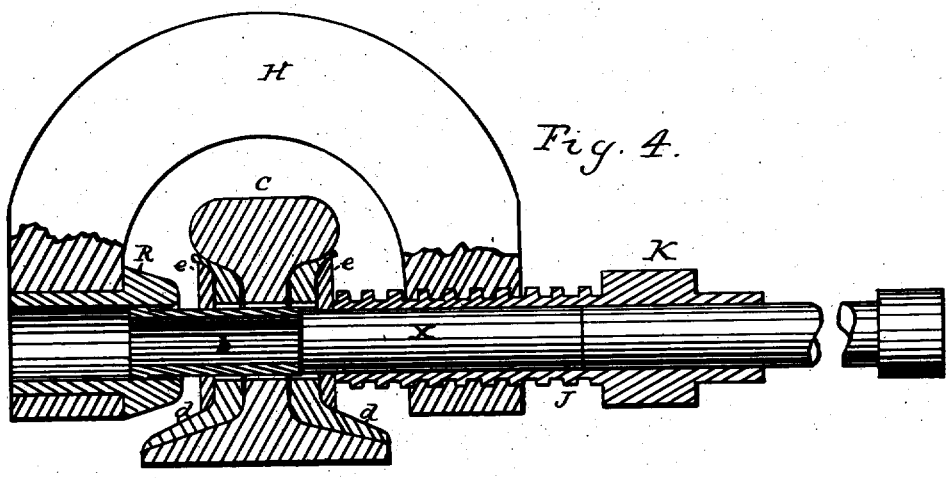

In order to illustrate some means for carrying my invention into effect, I have shown in Fig. 3, Sheet II of the drawings, an end elevation of one of the rails, and therewith an implement for enlarging the ends of the tubular rivet. In Fig. 4 of the same sheet I have also represented a sectional view of a railway-rail, the splice-plate, rivet, and an implement for unfastening and releasing said rivets.

Referring by letter to the said figures, H is a U-shaped clamp, the extremities of which are just far enough apart to answer the purposes of its construction. Through one end of this clamp passes a hollow but very powerful screw, J, on the outer end, K, of which provision is made for turning it by means of a wrench or rod. In the hollow of the opposite end of this screw is placed a steel tool, *l*, furnished with a conical projection, as shown in dotted lines, Fig. 3, the largest diameter of which just equals the size of the hole through the tubular rivet intended to be operated on. Immediately around the point of its largest conical diameter the tool is encircled by a collar or flange, S, in width a little more than the thickness of the tubular rivet. Supported by the other leg of the U-shaped clamp H, and on the same axial line, is arranged a hollow seat, R, as shown more clearly in Fig. 4, and within this seat I secure a tool composed of a short rod, as indicated by dotted lines R′, Fig. 3, the same having a collar, *t*, and a conical end or mandrel, *l′*, (also shown by dotted lines, Fig. 3,) said mandrel corresponding in size and form to the conical mandrel *l* upon the opposite end of the U-shaped bar H.

On the application of a long lever to the screw, a powerful pressure may be brought to bear on both ends of the rivets imultaneously, sufficient to crush, stave up, and thicken the projecting ends, so as to form a head thereon, and that without flaring or spreading its central bore. Thus each rivet may be fastened in regular successive order.

In case it should become necessary to remove a rivet, the conically-pointed tools may be taken out from the clamp, so that on the application of the clamp to the rivet it will be found that the hollow of the screw will fit over one end of the rivet, and the hollow of the seat R in the opposite leg of the clamp over the other end of the rivet, and when screwed tightly down, on the insertion of a flat or square ended steel rod or drift, X, in the hollow of the screw, the rivet may be, by a few sharp blows, driven out.

Having therefore described my improvement and also a conveniently-constructed device for carrying the same into effect, what I claim is—

The method of securing fish-plates to railway-rails with tubular rivets, by upsetting (in contradistinction to the spreading process) both ends of a tubular rivet, so as to form heads or shoulders upon both ends thereof, and without enlarging its interior diameter, after the said rivet has been placed in position through the fish-plates and rail, substantially as specified.

E. BOURNE.

Witnesses:
A. C. JOHNSTON,
C. G. PAGE.